Oct. 10, 1961 F. L. SHIVER, SR., ET AL 3,003,710

AUTOMATIC TAPE PLAYING MACHINE

Filed Aug. 26, 1960 5 Sheets-Sheet 1

INVENTORS
FORREST L. SHIVER, SR.
FORREST L. SHIVER, JR.
BY ROBERT A. LESTER, JR.

McMorrow, Berman & Davidson
ATTORNEYS.

Oct. 10, 1961 F. L. SHIVER, SR., ET AL 3,003,710

AUTOMATIC TAPE PLAYING MACHINE

Filed Aug. 26, 1960 5 Sheets-Sheet 2

INVENTORS
FORREST L. SHIVER, SR.
FORREST L. SHIVER, JR.
BY ROBERT A. LESTER, JR.

McMorrow, Berman + Davidson
ATTORNEYS

INVENTORS
FORREST L. SHIVER, SR.
FORREST L. SHIVER, JR.
BY ROBERT A. LESTER, JR.

McMorrow, Berman & Davidson
ATTORNEYS.

AUTOMATIC TAPE PLAYING MACHINE

Filed Aug. 26, 1960 5 Sheets-Sheet 4

INVENTORS
FORREST L. SHIVER, SR.
FORREST L. SHIVER, JR.
BY ROBERT A. LESTER, JR.

McMorrow, Berman & Davidson
ATTORNEYS.

AUTOMATIC TAPE PLAYING MACHINE

Filed Aug. 26, 1960 5 Sheets-Sheet 5

INVENTORS
FORREST L. SHIVER, SR.
FORREST L. SHIVER, JR.
BY ROBERT A. LESTER, JR.

McMorrow, Berman + Davidson
ATTORNEYS.

United States Patent Office 3,003,710

Patented Oct. 10, 1961

3,003,710

AUTOMATIC TAPE PLAYING MACHINE

Forrest L. Shiver, Sr., and Forrest L. Shiver, Jr., both of 709 W. Alden Ave., and Robert A. Lester, Jr., R.F.D. 2, all of Valdosta, Ga.

Filed Aug. 26, 1960, Ser. No. 52,170
7 Claims. (Cl. 242—55.12)

This invention relates to sound record playing apparatus, and more particularly to an automatic magnetic tape playback machine.

A main object of the invention is to provide a novel and improved playback apparatus for reproducing sound recorded on magnetic tape, the apparatus being relatively simple in construction, being substantially automatic in operation, and being especially suitable for use in conjunction with vending machines and similar devices for presenting an audible advertising message concurrently with the operation of the vending machine.

A further object of the invention is to provide an improved automatic playback apparatus for reproducing sound recorded on magnetic tape, the apparatus involving relatively inexpensive components, being compact in size, being durable in construction, and being especially suitable for use in presenting advertising messages, for example, in conjunction with machines for vending various products, such as soft drinks, cigarettes, candy, peanuts, beverages of various kinds, and the like.

A still further object of the invention is to provide an improved automatic magnetic tape playback machine which is especially suitable for use in presenting an audible advertising message concurrently with dispensing of an article from a vending machine, the apparatus being arranged so that it is placed in operation automatically responsive to the actuation of the associated vending machine, and being provided with means for automatically reversing same when the end of the advertising message is reached and for setting up the machine for operation when the associated vending machine is again operated.

A still further object of the invention is to provide an improved automatic tape playback apparatus especially adapted for use in reproducing advertisements or announcements of general public interest, the apparatus being especially adaptable for use in conjunction with coin-operated devices, such as vending machines, the device being neat in appearance, being reliable in operation, and in no way interfering with the operation of the associated coin-controlled device.

Further objects and advantages of the invention will become apparent from the following description and claims, and from the accompanying drawings, wherein:

Figure 8:
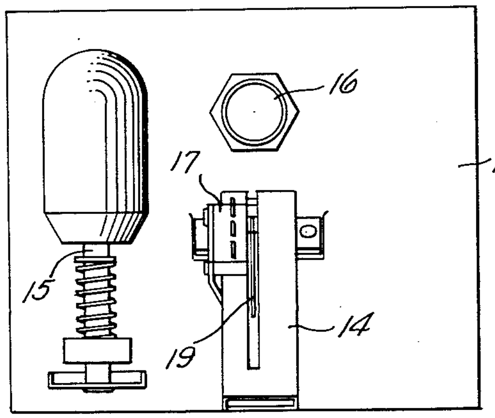
FIGURE 8 is a rear elevational view of the vending machine panel and associated assembly of FIGURES 6 and 7.

Referring to the drawings, 11 generally designates a magnetic tape playback machine constructed in accordance with the present invention, the machine being particularly suited for use in conjunction with a coin-controlled, or similar, vending machine and being especially adapted to provide an audible advertising message relating to the products dispensed by such a vending machine. Thus, the tape playback device 11 may be employed in conjunction with a vending machine having a front panel 12, such as that shown in FIGURES 6, 7 and 8, the panel being provided with a coin slot 13 opening at the front face of the panel and being adapted to receive a coin for admission into a coin chute 14 which is directed toward a suitable control mechanism, of conventional construction, and which is no part of the present invention, for dispensing a food article or other article. The dispensing machine panel 12 may be provided with a suitable coin-return plunger 15 and with an indicating window 16 adapted to be illuminated so as to provide an indication of the operative condition of the dispensing machine. The details of the dispensing machine are not illustrated since they form no part of the present invention except for the coin slot 13, the associated coin chute 14 and a coin-operated switch 17 mounted on the coin chute 14. The switch 17 is provided with a depending detection arm 19 which is interposed sufficiently in the path of a coin descending through the chute 14 to be engaged by the coin and to be rotated through a sufficient angle to close the switch 17.

Figure 9:
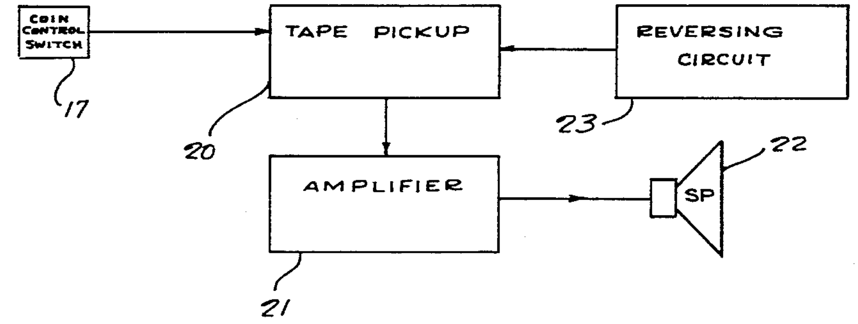
FIGURE 9 is a block diagram showing the general arrangement and inter-relationship of the electrical components of the magnetic tape playback apparatus of FIGURES 1 to 5 and the coin-operated switch element associated therewith on the vending machine panel with which the device is employed.

Referring to FIGURE 9, it will be seen that the switch 17 is cooperatively related with the magnetic tape playback apparatus, and as will presently be explained, the playback apparatus is placed in operation responsive to the closure of switch 17. However, it will be understood that the switch 17 may comprise any desired type of control switch, either manual or automatic, and that the apparatus is not necessarily limited in its usefulness to employment with a coin controlled article dispensing device.

Figure 10:
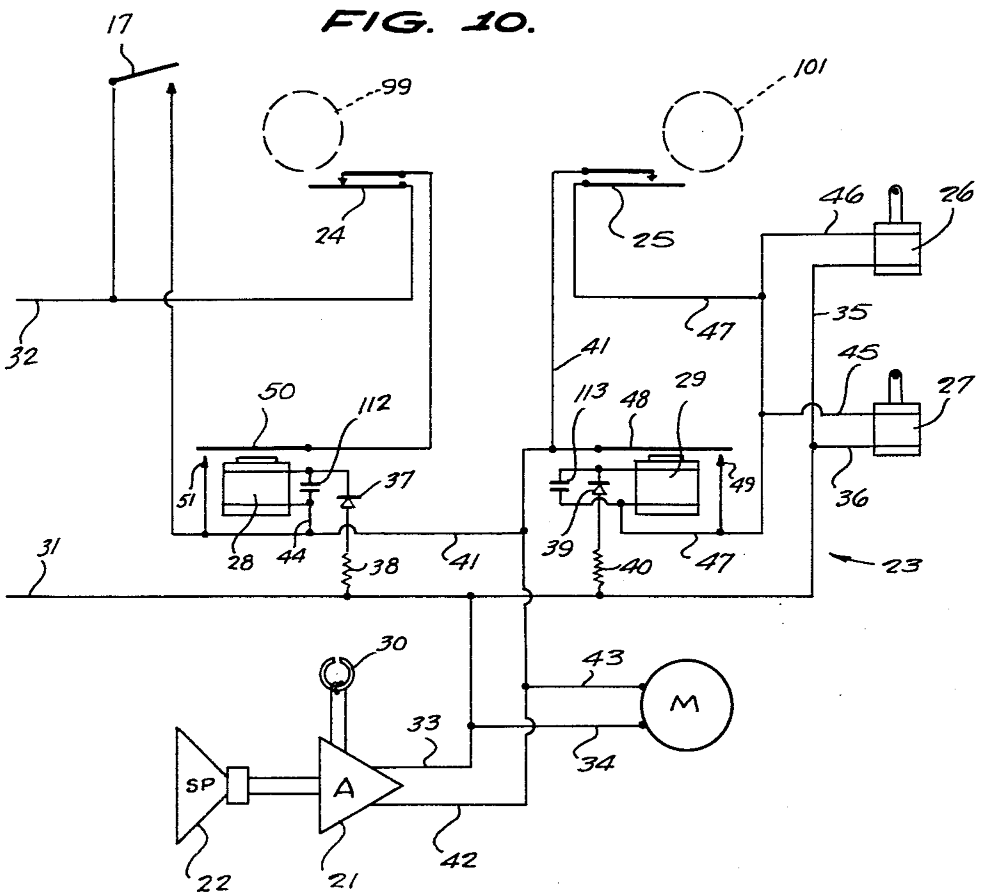
FIGURE 10 is an electrical wiring diagram showing the control circuit connections employed in the electrical system of FIGURE 9.

As shown in FIGURE 9, the switch 17 is connected to the playback device, said playback device comprising a tape pickup section 20, an amplifier 21, a loud speaker 22, and a reversing circuit section 23, the amplifier 21 and loud speaker 22 being of conventional construction and being illustrated as such in FIGURE 10.

As shown in FIGURE 10, the electrical components of the present invention include an electric motor 23, employed to drive the mechanical tape transport assembly, the control switch 17, a first, normally closed, tape-actuated switch 24, and a second tape-actuated switch 25, which is normally open, as illustrated. Also included in the electrical circuit are the reversing solenoid 26, the pressure roller and pressure pad-controlling solenoid 27, the main cycle relay 28, and the reversing relay 29. Designated at 30 is the magnetic transducer head which is connected in a conventional manner to the input of the amplifier 21.

As will be apparent from FIGURE 10, the electrical components of the device are energized from a pair of domestic power supply lines 31 and 32. The power line wire 31 is connected to one terminal wire of each of the elements 21, 23, 26, and 27 by the respective wires 33, 34, 35 and 36, as shown. One terminal of the winding of relay 28 is connected through a rectifier 37 and a resistor 38 to the line wire 31 and one terminal of the winding of the relay 29 is connected through a rectifier 39 and a resistor 40 to said line wire 31.

The remaining power supply terminals of the amplifier 21, the motor 23, and the winding of relay 28 are connected to a common wire 41 through respective wires 42, 43 and 44, as shown, the wire 41 being connected to the line wire 32 through the control switch 17. The remaining terminals of the solenoids 27, 26 and the winding of the relay 29 are connected through the normally open plate-controlled switch 25 to said wire 41, by respective wires 45, 46 and 47, as shown.

The relay 29 is provided with a holding circuit comprising an armature 48 and a stationary contact 49, connected across the normally open switch 25, the armature 48 engaging the contact 49 to bridge the switch 25 responsive to the energization of the relay 29. The relay 28 is provided with an armature 50 and a stationary contact 51 engageable by said armature 50 responsive to the energization of the relay 28, the contact 51 and armature 50 being connected in series between the wire 41 and the line wire 32 through the normally closed switch 24. As will be presently explained, relay 28 becomes energized responsive to the closure of the control switch 17, and the armature 50 thus engages the contact 51 and bridges the switch 17 to maintain the relay 28 energized after switch 17 opens and until the tape-controlled switch 24 is actuated. Thus, since the wire 41 is connected through the switch 17 to the line wire 32, when switch 17 is closed, the winding of relay 28 becomes energized by a circuit comprising line wire 32, switch 17, wire 41, the winding of the relay 28, the rectifier 37, the resistor 38, and line wire 31. This causes armature 50 to engage contact 51, bridging the control switch 17 so that the energizing circuit of the relay 28 is maintained as long as switch 24 remains closed. The holding circuit for relay 28 thus comprises the line wire 32, the switch 24, the armature 50, the contact 51, the wire 41, the winding of relay 28, the rectifier 37, the resistor 38 and the line wire 31. When the energization of relay 28 occurs, the motor 23 and amplifier 21 are simultaneously energized, since wires 42 and 43 of amplifier 21 and motor 23 are connected to the wire 41.

As will be presently explained, the switch 25 is closed at the end of the recorded message, thus energizing the relay 29 through a circuit comprising line wire 32, switch 24, armature 50, contact 51, wire 41, switch 25, wire 47, the winding of relay 29, rectifier 39, resistor 40, and line wire 31. This causes armature 48 to engage contact 49 and bridge switch 25 so as to maintain relay 29 energized as long as wire 41 is connected to line wire 32. Under these conditions, the solenoids 26 and 27 are energized since they are connected across the wires 47 and 31. These solenoids remain energized as long as relay 29 remains energized, since the wire 47 is connected through the contact 49 and armature 48 of relay 29 to the wire 41.

The cycle of electrical operation of the circuit shown in FIGURE 10 consists first in the energization of the relay 28 by the closure of the control switch 17, which establishes the holding circuit for relay 28 and connects wire 41 to line wire 32 through armature 50 and contact 51. At the end of the recorded message, the tape closes switch 25, which energizes relay 29 and establishes its holding circuit by the closure of armature 48 with respect to contact 49. As above mentioned, this energizes the reversing solenoid 26 and the pressure roller and pressure pad controlling solenoid 27, causing rewind of the tape. At the conclusion of the rewind process, the switch 24 is opened by the tape, breaking the holding circuit for the relay 28, which disconnects wire 41 from line conductor 32, deenergizing the various electrical elements 21, 23, 26, 27 and 29, and resetting the apparatus for subsequent repeated operation.

As above mentioned, the closure of the control switch 17 also energizes the amplifier 21 and the motor 23 by connecting the wire 41 to the line wire 32.

Figure 1:
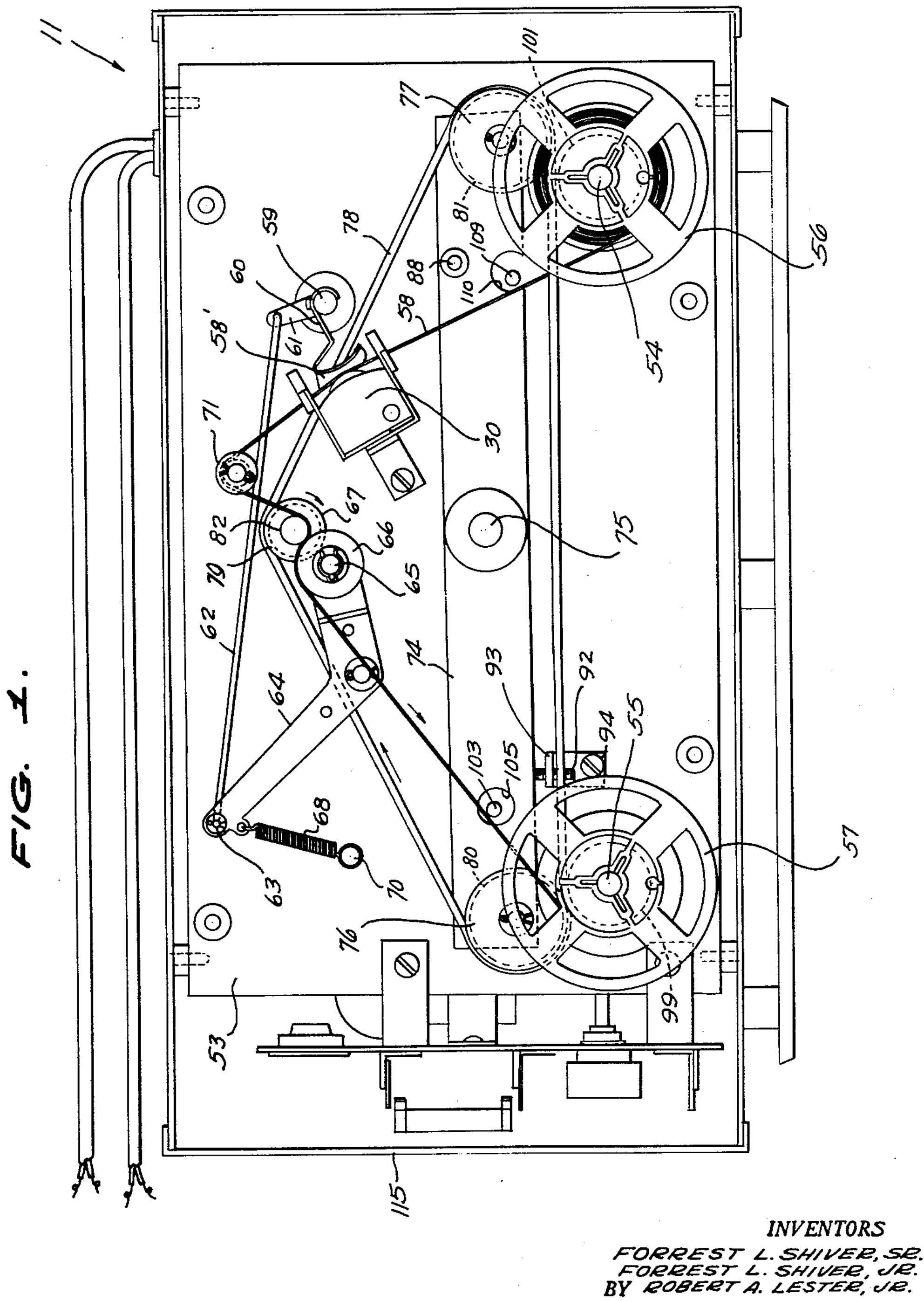
FIGURE 1 is a top plan view of an improved automatic magnetic tape playback device constructed in accordance with the present invention, shown with the top cover removed.

The playback apparatus comprises a main supporting deck 53 on which are journaled the supply reel spindle 54 and the takeup reel spindle 55 arranged to receive the respective supply and pickup reels 56 and 57. The opposite end portions of a prerecorded magnetic tape 58 are wound on the reels 56 and 57, the intervening tape portion being guided between the magnetic transducer head 30 and the pressure pad 58' mounted on a shaft 59 rotatably mounted on the deck 53. As shown, the pressure pad 58' is carried on an arm 60 which is rigidly secured to the shaft 59 and which is rotatable therewith. Also secured to the shaft 59 is an arm 61 which is connected by a link rod 62 to one end portion 63 of a bell crank lever 64 rotatably mounted on the deck 53. The other end portion of the bell crank lever 64 is provided with a shaft 65 on which is rotatably mounted a pressure roller 66 which is located adjacent a capstan roller 67 journaled on the deck 53. The bell crank lever 64 is biased in a counterclockwise direction, as viewed in FIGURE 1, by a coiled spring 68 connected thereto adjacent the end portion 63 thereof and connected to an upstanding pin 70 secured on deck 53. As shown in FIGURE 1, the tape 58 passes over an idler roller 71 and thence between the capstan roller 67 and the pressure roller 66, being held against the capstan roller 67 by the biasing force exerted on the bell crank lever 64 by spring 68. The spring 68 also acts to bias the shaft 59 in a counterclockwise direction, urging the pressure pad 58' towards the transducer head 30, so as to hold the tape 58 against the air gap portion of the head. However, when bell crank lever 64 is rotated in a clockwise direction, as viewed in FIGURE 1, the shaft 59 is rotated in a similar direction, moving the pad 58' away from transducer 30, so that the pressure pad 58' is disengaged from the tape simultaneously with the rotation of the pressure roller 66 away from the capstan 67.

Figure 3:
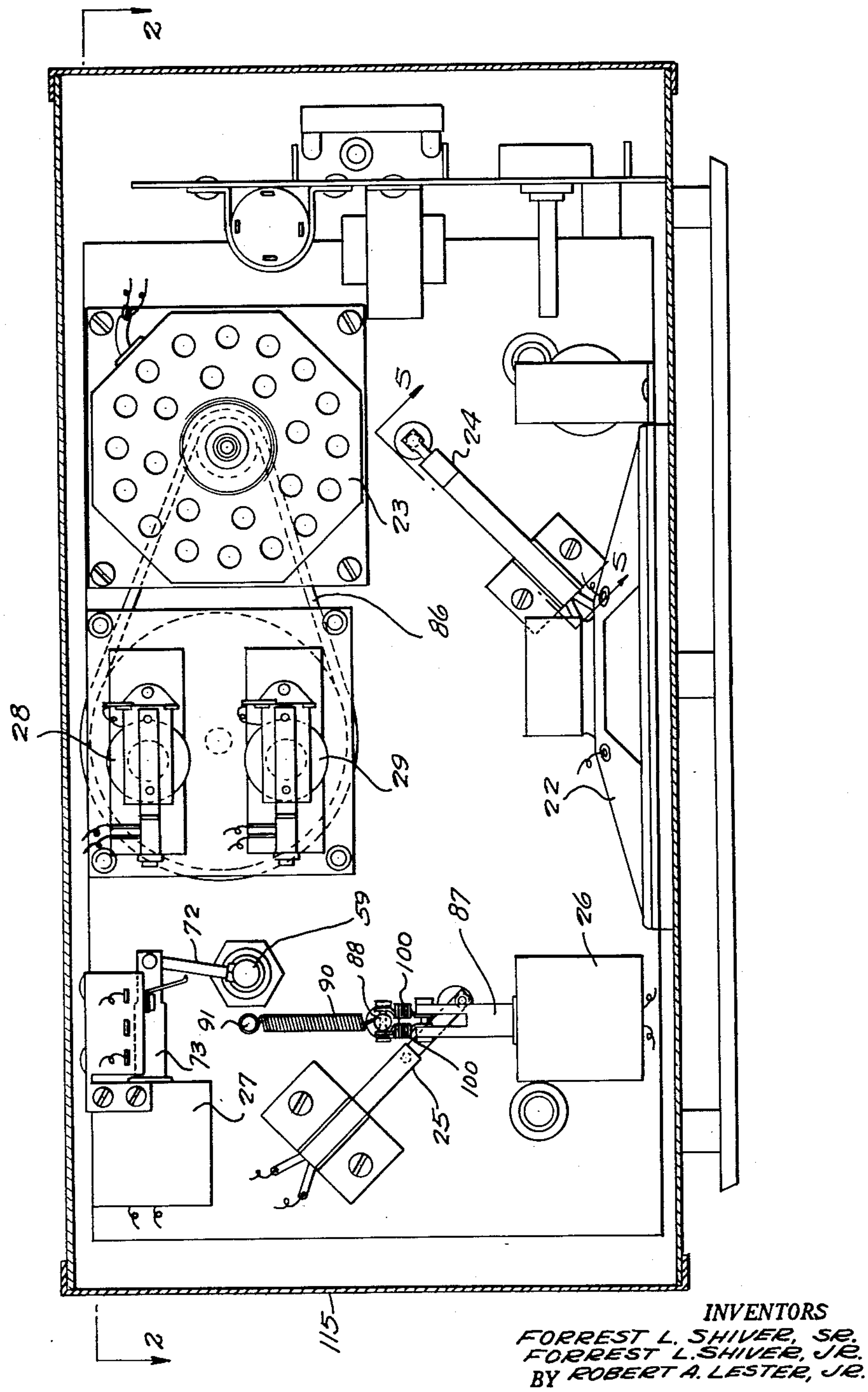
FIGURE 3 is a horizontal cross sectional view taken through the bottom portion of the automatic magnetic playback apparatus of FIGURE 1, substantially on the line 3—3 of FIGURE 2 and providing a bottom view of the tape playback apparatus.

As previously mentioned, the shaft 59 is rotatably mounted on the deck 53, and projects therebelow, the lower end of the shaft 59 being provided with an arm 72 which is connected to the end of the plunger 73 of solenoid 27 so as to be rotated in a counterclockwise direction, as viewed in FIGURE 3, responsive to the energization of said solenoid 27. This rotates arm 61 in a clockwise direction, as viewed in FIGURE 1, disengaging pressure pad 58' from tape 58 and moving pressure rollere 66 away from capstan roller 67, as above described.

Designated at 74 is a lever arm which is pivoted at its intermediate portion, as shown at 75, to the tape deck 53. Rotatably mounted on the opposite end portions of the arm 74 are grooved pulley members 76 and 77, and engaged around the grooved pulley members 76 and 77 and around the capstan roller 67 is a flexible belt 78. The capstan roller 67 is provided with a suitable peripheral groove 79 receiving the belt 78, the groove 79 being similar to the peripheral grooves 80 and 81 provided in the pulley members 76 and 77. The lever member 74 is relatively long so that the belt 78 remains in driving engagement with the pulleys 76 and 77 while allowing the arm 74 to be rotated slightly, for a purpose presently to be described.

Figures 2, 6, 7:
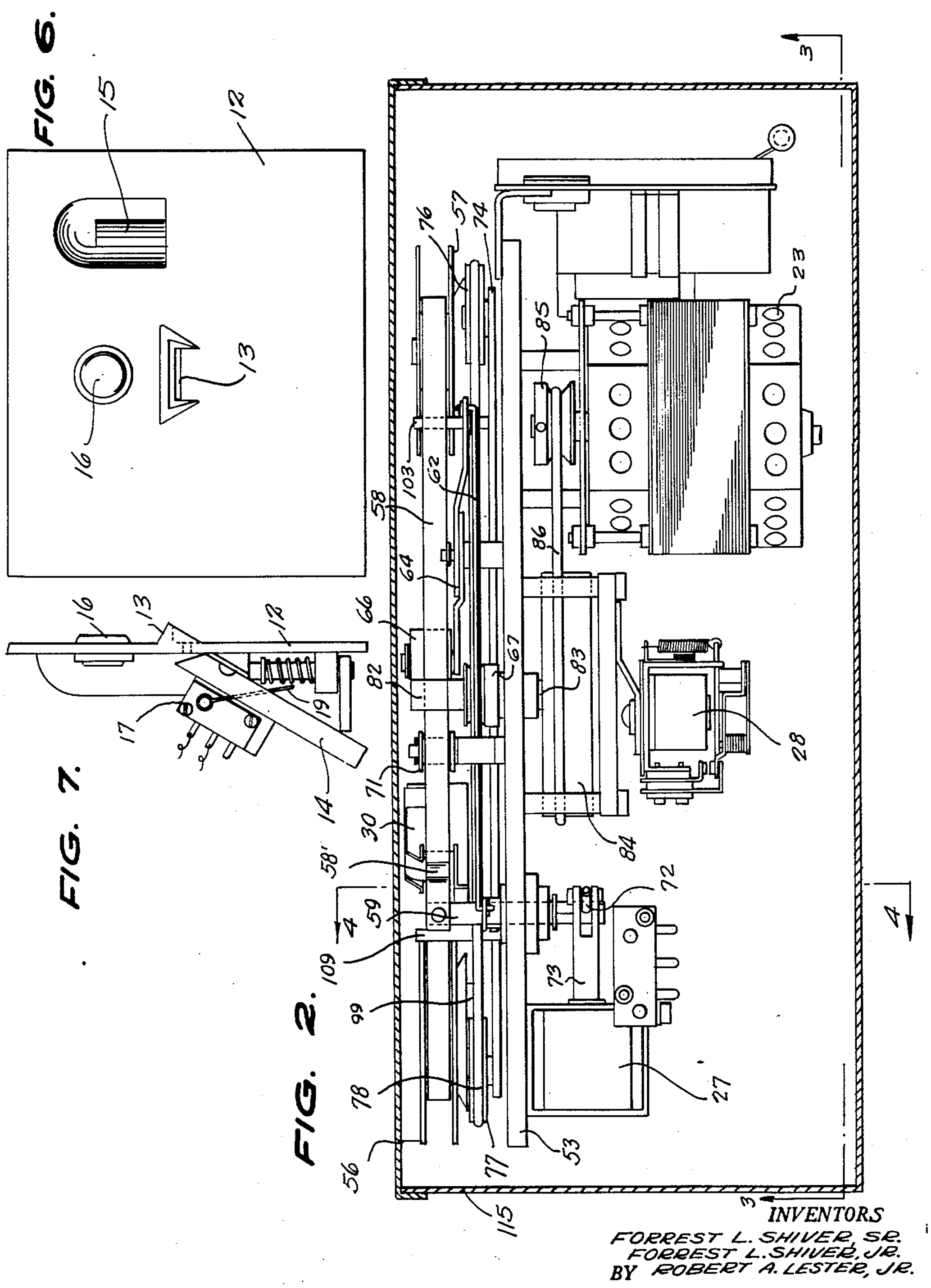
FIGURE 2 is a vertical cross sectional view taken through the magnetic tape playback apparatus of FIGURE 1 substantially on the line 2—2 of FIGURE 3.
FIGURE 6 is an elevational view of the panel of a coin-operated vending machine with which the magnetic tape playback device of FIGURES 1 to 5 may be associated so as to be operated responsive to the insertion of a coin into the coin slot of the vending machine panel.
FIGURE 7 is a side elevational view of the vending machine panel of FIGURE 6.
Figures 4, 5:
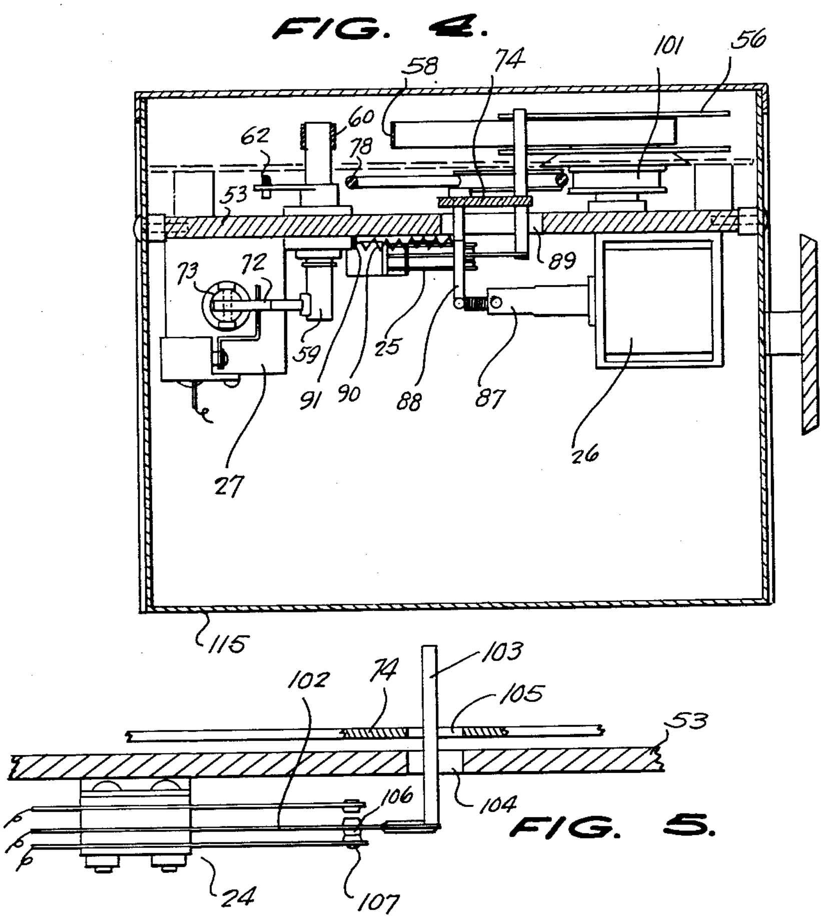
FIGURE 4 is a transverse vertical cross sectional view taken through the magnetic tape playback apparatus substantially on the line 4—4 of FIGURE 2.
FIGURE 5 is an enlarged vertical cross sectional view taken substantially on the line 5—5 of FIGURE 3.

As shown in FIGURE 1, the capstan roller 67 is provided with the reduced top portion 82, comprising the shaft of the roller, the top portion 82 receiving the tape 58. The lower portion of the shaft, shown at 83, depends below the deck 53 and is provided with the peripherally grooved fly wheel drum 84 which is connected to a drive pulley 85 on the shaft of motor 23 by a drive belt 86. As shown in FIGURE 2, the motor 23 is mounted below the tape deck member 53. The solenoids 27 and 26 are likewise mounted below the tape deck 53, the solenoid 26 being provided with the plunger 87 which is connected to the bottom end of a depending pin 88 secured to the arm 74 and extending through a slot 89 provided in the main deck member 53. The lever arm 74 is biased in a counterclockwise direction, as viewed in FIGURE 1, by a coil spring 90 connected between the pin 88 and a depending pin 91 secured to the bottom surface of the deck member 53, as shown in FIGURE 4. This biases the lever arm 74 into engagement with an adjustable stop screw 92 mounted on the outer flange 93 of an angle bracket secured to the main deck member 53, so that the lower edge of them arm 74, as viewed in FIGURE 1, is urged into engagement with the end of the stop screw 92.

The spring 90 biases the arm 74 to bring the portion of the belt 78 engaged on the pulley 76 into engagement with the periphery of a drum element 99 rigidly secured to the spindle 55 subjacent the reel 57, as shown in FIGURE 2, thus establishing driving relationship between the belt 78 and spindle 55 to cause reel 57 to rotate in a direction to wind up the tape 58 thereon. Thus, the belt 78 travels in a clockwise direction, as viewed in FIGURE 1, causing the reel 57 to rotate in a counterclockwise direction. As will be readily apparent, the capstan roller 67 likewise rotates in a clockwise direction, as viewed in FIGURE 1.

As shown in FIGURE 3, the end of the plunger 87 is connected to the pin 88 by a pair of relatively short coil springs 100, 100, so that when the plunger 87 is retracted, responsive to the energization of the solenoid 26, the lever arm 74 is rotated in a clockwise direction, as viewed in FIGURE 1, against the biasing force of the spring 90. This brings the portion of the belt 78 on the grooved pulley 77 into driving engagement with the periphery of a drive drum element 101 secured on the spindle 54 subjacent the reel 56. This releases the spindle 55 and drives the spindle 54 in a counterclockwise direction, as viewed in FIGURE 1, causing the tape 58 to be rewound thereon. The rewinding of the tape 58 is facilitated by the simultaneous disengagement of pressure pad 58' therefrom and the movement of the pressure roller 66 away from the capstan roller 67, as above described.

The normally closed tape-controlled switch 24 comprises a flexible arm 102 to the end of which is secured an upstanding pin member 103 which extends through an opening 104 provided in the main deck member 53 and also through a registering opening 105 formed in the arm 74, the opening 105 being of sufficient size to allow free rotation of arm 74 with respect to the pin member 103. The pin member 103 projects upwardly a sufficient distance so that it is located adjacent the tape 58 and is located so that it is engageable by the tape when the tape has been almost completely unwound from the reel 57, namely, has been substantially completely rewound on the reel 56. The engagement of the tape 58 with the pin member 103 rotates said pin member sufficiently to flex the arm 102 to a degree sufficient to disengage the contact portion 106 on the arm from the cooperating stationary contact portion 107 of switch 24, as viewed in FIGURE 5, thus opening the switch. Thus, when reel 57 is substantially depleted, the switch 24 will open and will remain open until enough playback movement of the tape 58 on the reel 57 has occurred to allow contact element 106 to engage contact element 107 on the switch 24. This playback movement occurs when the control switch 17 is closed, since this immediately energizes the motor 23. By the time that the switch 17 opens, the tape will have moved sufficiently to allow switch 24 to close so as to allow the holding circuit for the relay 28 to be maintained. Thus, the cycle of operation may be initiated by the closure of the switch 17, but the switch 24 terminates the cycle at the end thereof when the tape has been substantially rewound on the supply reel 56.

The normally open switch 25 is likewise provided with a flexible arm and an upstanding pin member, shown at 109, the pin member 109 being engageable by the tape 58 when the reel 56 is substantially depleted, namely, at the end of the playback of the recorded message on the tape, causing the switch arm associated with the switch 25 to flex sufficiently to close the switch. The closure of the switch 25 energizes the relay 29, as above described, and causes the solenoids 26 and 27 to be energized providing the rewind action of the tape on the reel 56 already described.

As shown in FIGURE 1, the pin 109 projects upwardly through a notch 110 formed in the arm 74, said notch 110 being of sufficient size to allow free movement of the arm 74 as required for operation of the device.

Summarizing the operation of the device, when the switch 17 is closed, the tape is moved sufficiently to allow switch 24 to close, establishing the holding circuit for the relay 28, so that the relay becomes energized and maintains the energization of the motor 23 and the amplifier 21 as long as switch 24 remains closed. After the recorded message has been played back, the tape causes switch 25 to close, energizing the relay 29 and the solenoids 26 and 27. This rotates the arm 74 and causes the reversal of movement of the tape, the tape being wound up on the reel 56 and being free to do so by the disengagement of the pressure pad 58' therefrom and the movement of the roller 66 away from the capstan roller 67, above described. The rewind action continues until the tape is substantially completely rewound on the reel 56, whereby pin 103 is engaged to open switch 24, as above described, releasing the relay 28 and resetting the device for the next operation thereof.

As shown, the relays 28 and 29 are provided with filter condensers 112 and 113 connected across their windings so as to smooth out the fluctuations in the rectified current applied to the windings of the relays.

The apparatus is substantially self-contained, and is preferably mounted in a suitable housing 115 which may be incorporated with the main housing of the dispensing device on which the apparatus is employed. The amplifier 21 and the various control elements associated therewith are contained within the housing 115 and are preferably attached to and supported on the deck member 53 in a suitable manner to provide convenience in servicing.

As above mentioned, the apparatus may be employed not only in conjunction with dispensing machines, but also wherever a message is to be furnished to the public, and may be operated not only by manual actuation of the control switch 17 but also by any automatic actuating means appropriate to the conditions under which the apparatus is employed.

While a specific embodiment of an improved magnetic tape playback apparatus has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a tape transport mechanism of the type including a support, a pair of reels journaled on said support and arranged to receive the opposite end portions of a magnetic tape wound thereon, and a magnetic transducer head, the improvement comprising an arm pivoted to said support and extending adjacent the reels, a drive capstan mounted on said support, guide means for supporting a magnetic tape wound on said reels adjacent said transducer head and adjacent said drive capstan, respective drive drums connected to the reels, respective pulley members journaled on the arm adjacent said drive drums, an endless flexible belt member engaged around the pulley members and drive capstan, an electric motor connected to the drive capstan, switch means extending adjacent one of the reels and engageable by the portion of the tape adjacent thereto when a predetermined amount of tape is on the reel, means biasing the arm towards a position wherein said flexible belt engages one of the drive drums, whereby to rotate the associated reel and move the tape in one direction, and means to rotate said arm to a position wherein the flexible belt engages the other drive drum responsive to the engagement of said switch means by said tape portion, whereby to rotate the other reel and reverse the direction of movement of the tape.

2. In a tape transport mechanism of the type including a support, a pair of reels journaled on said support and arranged to receive the opposite end portions of a magnetic tape wound thereon, and a magnetic transducer head, the improvement comprising an arm pivoted at its intermediate portion to said support and extending adjacent the reels, a drive capstan mounted on said support, a pressure roller movably mounted on the support adjacent the drive capstan, means biasing said pressure roller toward the drive capstan, guide means for supporting a magnetic tape wound on said reels adjacent said transducer head and between said pressure roller and said drive capstan, respective drive drums connected to the reels, respective pulley members journaled on the arm adjacent said drive drums, an endless flexible belt member engaged around the pulley members and drive capstan, an electric motor connected to the drive capstan, switch means extending adjacent one of the reels and engageable by the portion of the tape adjacent thereto when a predetermined amount of tape is on the reel, means biasing the arm towards a position wherein said flexible belt engages one of the drive drums, whereby to rotate the associated reel and move the tape in one direction, means to rotate said arm to a position wherein the flexible belt engages the other drive drum responsive to the engagement of said switch means by said tape portion, whereby to rotate the other reel and reverse the direction of movement of the tape, and means to move said pressure roller away from the drive capstan simultaneously with such rotation of the arm.

3. In a tape transport mechanism of the type including a support, a pair of reels journaled on said support and arranged to receive the opposite end portions of a magnetic tape wound thereon, and a magnetic transducer head, the improvement comprising an arm pivoted at its intermediate portion to said support and extending adjacent the reels, a drive capstan mounted on said support, a pressure roller movably mounted on the support adjacent the drive capstan, means biasing said pressure roller toward the drive capstan, guide means for supporting a magnetic tape wound on said reels adjacent said transducer head and between said pressure roller and said drive capstan, respective drive drums connected to the reels, respective pulley members journaled on the arm adjacent said drive drums, an endless flexible belt member engaged around the pulley members and drive capstan, an electric motor connected to the drive capstan, an energizing circuit connected to said electric motor, switch means extending adjacent one of the reels and engageable by the portion of the tape adjacent thereto when a predetermined amount of tape is on the reel, means biasing the arm towards a position wherein said flexible belt engages one of the drive drums, whereby to rotate the associated reel and move the tape in one direction, means to rotate said arm to a position wherein the flexible belt engages the other drive drum responsive to the engagement of said switch means by said tape portion, whereby to rotate the other reel and reverse the direction of movement of the tape, means to move said pressure roller away from the drive capstan simultaneously with such rotation of the arm, and means to open the energizing circuit of the motor when a predetermined amount of tape has been rewound onto said other reel.

4. In a tape transport mechanism of the type including a support, a pair of reels journaled on said support and arranged to receive the opposite end portions of a magnetic tape wound thereon, and a magnetic transducer head, the improvement comprising an arm pivoted at its intermediate portion to said support and extending adjacent the reels, a drive capstan mounted on said support, a pressure roller movably mounted on the support adjacent the drive capstan, a pressure pad movably mounted on the support adjacent said transducer head, means biasing said pressure pad towards said head, means biasing said pressure roller towards the drive capstan, guide means for supporting a magnetic tape wound on said reels adjacent said transducer head and between said pressure roller and said drive capstan and extending between said pressure pad and said head, respective drive drums connected to the reels, respective pulley members journaled on the arm adjacent said drive drums, an endless flexible belt member engaged around the pulley members and drive capstan, an electric motor connected to the drive capstan an energizing circuit connected to the motor, switch means extending adjacent one of the reels and engageable by the portion of the tape adjacent thereto when a predetermined amount of tape is on the reel, means biasing the arm towards a position wherein said flexible belt engages one of the drive drums, whereby to rotate the associated reel and move the tape in one direction, means to rotate said arm to a position wherein the flexible belt engages the other drive drum responsive to the engagement of said switch means by said tape portion, whereby to rotate the other reel and reverse the direction of movement of the tape, means to move said pressure roller away from the drive capstan and to move said pressure pad away from said head simultaneously with such rotation of the arm, and means to open the energizing circuit of the motor when a predetermined amount of tape has been rewound onto said other reel.

5. In a tape transport mechanism of the type including a support, a pair of reels journaled on said support and arranged to receive the opposite end portions of a magnetic tape wound thereon, and a magnetic transducer head, the improvement comprising an arm pivoted to said support and extending adjacent the reels, a drive capstan mounted on said support, guide means for supporting a magnetic tape wound on said reels adjacent said transducer head and adjacent said drive capstan, respective drive drums connected to the reels, respective pulley members journaled on the arm adjacent said drive drums, an endless flexible belt member engaged around the pulley members and drive capstan, an electric motor connected to the drive capstan, an energizing circuit connected to said motor and including a remote switch and a control relay energized responsive to closure of said switch, said relay having a holding circuit including normally closed switch means extending adjacent one of the reels and being engageable by the portion of the tape adjacent thereto to open same when a predetermined amount of tape is wound on the reel, further switch means extending adjacent the other reel and engageable by the portion of the tape adjacent said other reel when a predetermined amount of tape remains on said other reel, means biasing the arm towards a position wherein said flexible belt engages the drive drum associated with said one reel, whereby to rotate said one reel to wind the tape thereon, and means to rotate said arm to a position wherein the flexible belt engages the other drive drum responsive to the engagement of said further switch means by said last-named tape portion, whereby to rotate said other reel and reverse the direction of movement of the tape.

6. In a tape transport mechanism of the type including a support, a pair of reels journaled on said support and arranged to receive the opposite end portions of a magnetic tape wound thereon, and a magnetic transducer head, the improvement comprising an arm pivoted at its intermediate portion to said support and extending adjacent the reels, a drive capstan mounted on said support, a pressure roller movably mounted on the support adjacent the drive capstan, means biasing said pressure roller towards the drive capstan, quide means for supporting a magnetic tape wound on said reels adjacent said transducer head and between said pressure roller and said drive capstan, respective drive drums connected to the reels, respective pulley members journaled on the arm adjacent said drive drums, an endless flexible belt member engaged around the pulley members and drive capstan, an electric motor connected to the drive capstan, an energizing circuit connected to said motor and including a remote switch and a control relay energized responsive to closure of said switch, said relay having a holding circuit including normally closed switch means extending adjacent one of the reels and being engageable by the portion of the tape adjacent thereto to open same when a predetermined amount of tape is wound on the reel, further switch means extending adjacent the other reel and engagegable by the portion of the tape adjacent said other reel when a predetermined amount of tape remains on said other reel, means biasing the arm towards a position wherein said flexible belt engages the drive drum associated with said one reel, whereby to rotate said one reel to wind the tape thereon, means to rotate said arm to a position wherein the flexible belt engages the other drive drum responsive to the engagement of said further switch means by said last-named tape portion, whereby to rotate said other reel and reverse the direction of movement of said tape, and means to move said pressure roller away from the drive capstan simultaneously with said rotation of the arm.

7. In a tape transport mechanism of the type including a support, a pair of reels journaled on said support and arranged to receive the opposite end portions of a magnetic tape wound thereon, and a magnetic transducer head, the improvement comprising an arm pivoted at its intermediate portion to said support and extending adjacent the reels, a drive capstan mounted on said support, a pressure roller movably mounted on the support adjacent the drive capstan, a pressure pad movably mounted on the support adjacent said transducer head, means biasing said pressure pad towards said head, means biasing said pressure roller towards the drive capstan, guide means for supporting a magnetic tape wound on said reels adjacent said transducer and between said pressure roller and said drive capstan and extending between said pressure pad and said head, respective drive drums connected to the reels, respective pulley members journaled on the arm adjacent said drive drums, an endless flexible belt member engaged around the pulley members and drive capstan, an electric motor connected to the drive capstan, an energizing circuit connected to said motor and including a remote switch and a control relay energized responsive to closure of said switch, said relay having a holding circuit including normally closed switch means extending adjacent one of the reels and being engageable by the portion of the tape adjacent thereto to open same when a predetermined amount of tape is wound on the reel, further switch means extending adjacent the other reel and engageable by the portion of the tape adjacent said other reel when a predetermined amount of tape remains on said other reel, means biasing the arm towards a position wherein said flexible belt engages the drive drum associated with said one reel, whereby to rotate said one reel to wind the tape thereon, means to rotate said arm to a position wherein the flexible belt engages the other drive drum responsive to the engagement of said further switch means by said last-named tape portion, whereby to rotate said other reel and reverse the direction of movement of the tape, and means to move said pressure roller away from the drive capstan and to move said pressure pad away from said head simultaneously with such rotation of the arm.

No references cited.